March 29, 1932. J. F. G. P. HARTMANN 1,851,704
APPARATUS FOR CLOSING AND INTERRUPTING AN ELECTRIC CIRCUIT
Filed July 12, 1928   3 Sheets-Sheet 1
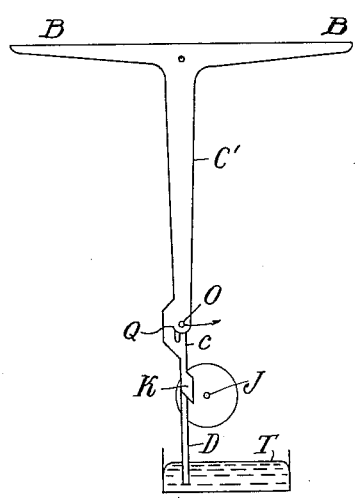
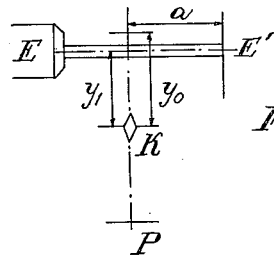
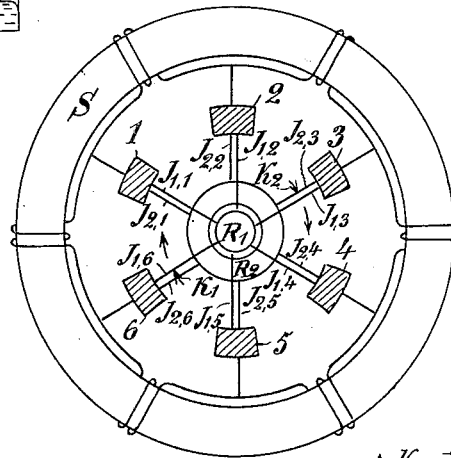
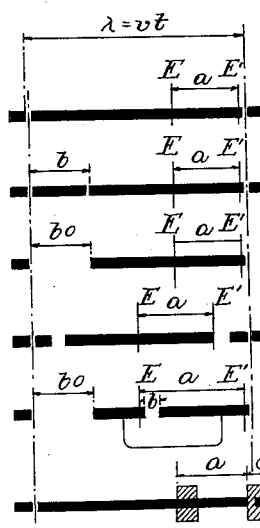

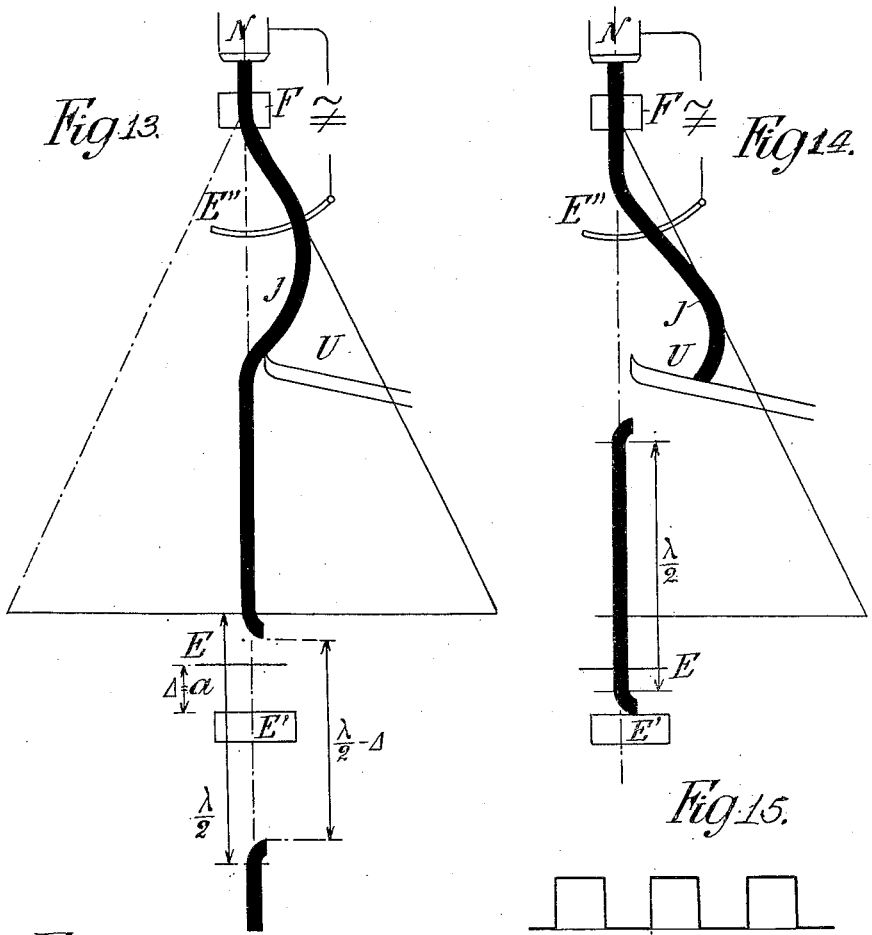
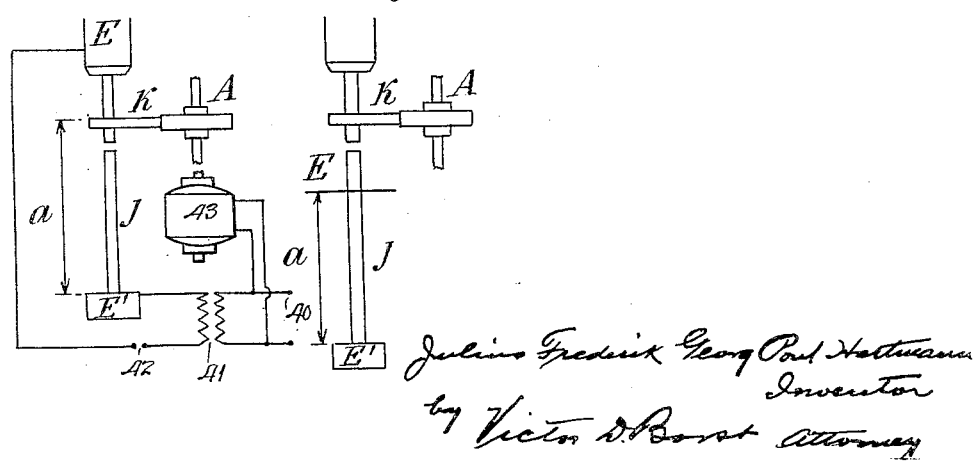

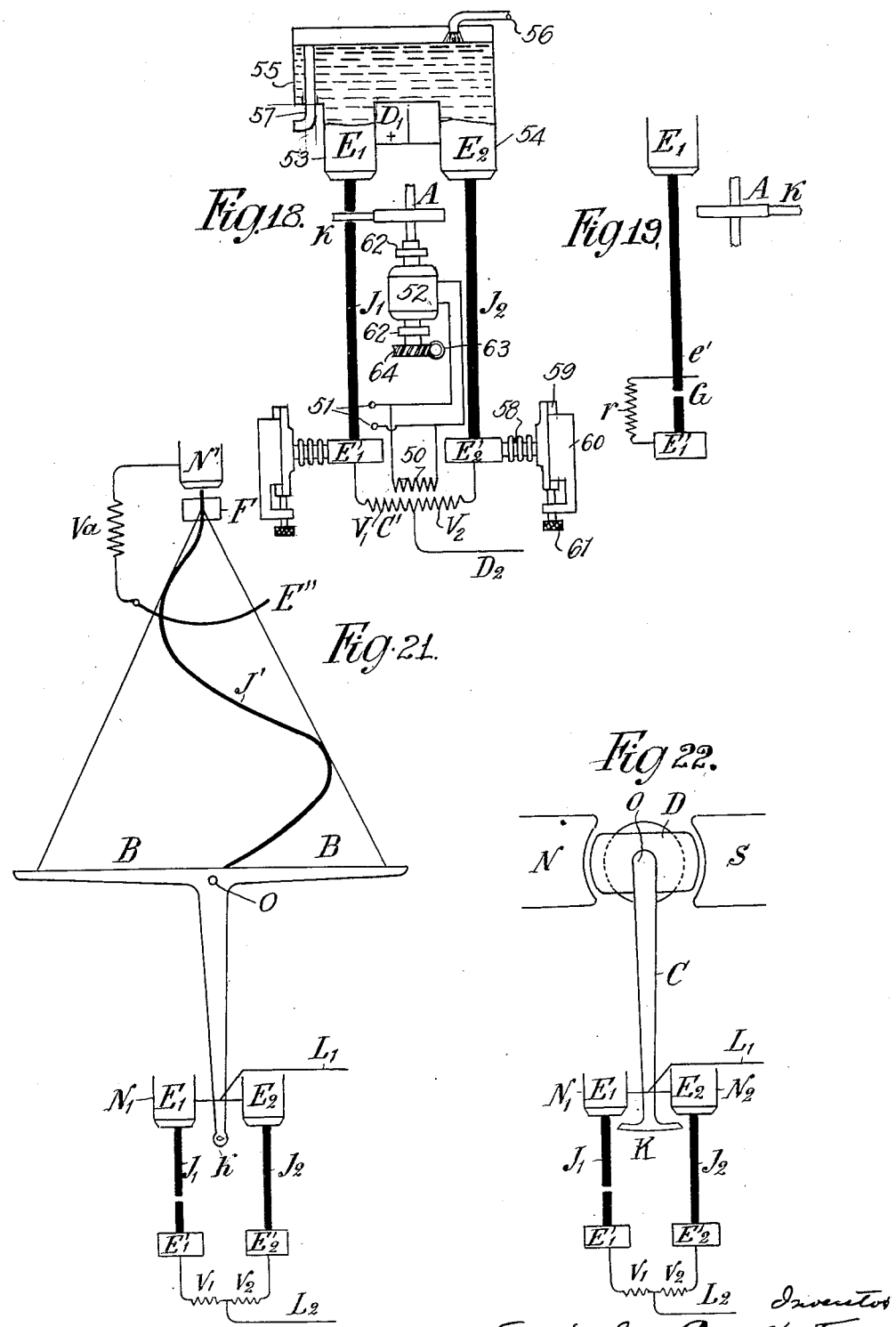

Patented Mar. 29, 1932

1,851,704

UNITED STATES PATENT OFFICE

JULIUS FREDERIK GEORG POUL HARTMANN, OF COPENHAGEN, DENMARK

APPARATUS FOR CLOSING AND INTERRUPTING AN ELECTRIC CIRCUIT

Application filed July 12, 1928, Serial No. 292,178, and in Great Britain July 21, 1927.

This invention relates to an apparatus for closing and interrupting an electric circuit and more specially an apparatus for rectifying or commutating an alternating voltage.

According to the general principles of the invention the apparatus comprises a conductive liquid jet travelling at a constant velocity, at least two electrodes adapted to be touched by the said jet and at least one knife adapted to cut the jet periodically in order to produce a jet chain with straight links which connect the said electrodes synchronously with the said alternating voltage.

The invention further comprises other features which will appear from the following detailed description.

Referring now to the accompanying drawings

Figures 1–6 show diagrammatically various forms of straight chain conductors,

Figures 7–10 show various forms of chain conductors produced by cutting a liquid jet by one or more rotating knives, Figures 11 and 12 illustrate methods of cutting a liquid jet by an oscillating knife, Figures 13 and 14 illustrate a method of producing a jet chain of a jet wave consisting of curved and straight parts, the jet being shown in two different positions, Figure 15 shows diagrammatically the pulsating current used for producing the jet wave shown in the preceding figures, Figures 16 and 17 show two embodiments of rotary jet chain rectifiers, Figure 18 shows a commutator comprising two rectifiers of the type shown in Figure 16, Figure 19 shows a modification of the same, Figure 20 shows a commutator for a direct current generator involving the principles of the invention, and Figures 21 and 22 show two embodiments of commutators making use of an oscillating knife driven by a jet wave vibrator and a moving coil vibrator respectively.

The general principles underlying the invention will first be more fully explained whereafter some of the practical uses of the apparatus according to the invention will be described.

*The chain conductor*

In Figures 1–6 is shown an infinite electrical conductor C which has been divided into pieces or links. It is assumed that the total device, the chain conductor, travels with constant velocity $v$ along its own axis and that two electrodes E and E′ are constantly touching the chain during its progress. Every time a cut comes inside the space between the two electrodes the electric connection between the same is interrupted. In Figure 1 in which the links are of equal length $\lambda$ there will occur one interruption during the time T which it takes for the chain to proceed one link. The said time, the period of the travelling chain, is thus determined by the expression $$1° \quad \lambda = vT.$$

The time during which E and E′ are connected, the time of connection, is $$2° \quad T_c \frac{\lambda - a}{v}$$

and the time of interruption is $$3° \quad T_i = \frac{a}{v},$$

$a$ being the distance between the electrodes E and E′.

There may be more than one cut to the link-length $\lambda$. In Figure 2 there are two cuts at a distance $b$ from each other. If it is not desired to have the electrodes E and E′ connected more than one time during the period, obviously the condition $$4° \quad a \geqq b$$

must be fulfilled. Under this supposition the following will be true:

$$5° \quad T_c = \frac{\lambda - b - a}{v}$$

and $$6° \quad T_i = \frac{b + a}{v}.$$

Alternately the chain may have interspaces of greater length $b_0$ between the links, Figure 3. Again $$7° \quad T_c \frac{\lambda - b_0 - a}{v}$$

and $$8° \quad T_i = \frac{b_0 - a}{v}.$$

More complicated chain conductors may be used for the closing and interruption of a circuit once in the period T. Thus Figure 4 shows a chain C with two gaps to the link-length. A chain like that in Figure 5 with interconnected conductive pieces inside each link is of course about the same as one without the gap $b'$. The question about the influence of the width of the electrodes is considered in Figure 6 corresponding to Figure 1. The time of connection is now $$T'_c = \frac{\lambda - a + c}{v},$$

$c$ being the width of the electrodes.

Jet chain conductors

A very simple way of producing a chain conductor is to apply a conductive liquid jet which is cut periodically by a knife K, rotating in a plane perpendicular to the jet Figure 7. If a chain of the period T is desired for example, a knife which rotates once in the time T may be used. In this way a chain of the type in Figure 1 is obtained. If it be desired to make the interval of connection equal to $$\frac{T}{2},$$

according to 2°, it will be necessary to adjust the distance $a$ to be $\lambda/2$ and if $T_c$ is desired to be $$\frac{T}{6} a \text{ must be } \frac{5}{6}\lambda$$

and so on. It is possible to utilize the nozzle proper N as one electrode E, Figure 8. This actually amounts to the same as to fix the electrode E in the point P, thus nearly in the plane of the knife K. In order to give the time of connection the right value it is sufficient to adjust the electrode E' only, but of course the distance $a$ may also be adjusted by moving the knife K with regard to the electrode E'.

A jet chain of the type shown in Figure 2 is obtained by cutting the jet by two knives $K_1$ and $K_2$. The knives may be arranged at the same distance from the jet as shown in Figure 9. The effect is, according to 5°, that the distance $a$ is reduced by the distance $X_1$ between the two cuts. Both of the knives $K_1$ and $K_2$ may with the same effect be placed in the plane of rotation, Figure 10. If their angular distance is $\theta$, $b$ will be $$\frac{\theta}{2\pi} \cdot T \cdot v = \frac{\theta}{2\pi} \cdot \lambda$$

and thus $$a = \lambda - \frac{\theta}{2\pi}\lambda.$$

If now for instance it is desired to make the interval of connection equal to $$\frac{T}{2}$$

it is derived from 5°.

$$9° \quad a = \frac{\lambda}{2} \div \frac{\theta}{\pi} \cdot \frac{\lambda}{2}.$$

As $a$ must be less than $b$, it is found that the greatest value of $\theta$, determined by putting $b = a$, is $$\frac{\pi}{2},$$

thus 90°. With this value $a$ is equal to $$\frac{\lambda}{4}.$$

It may still be noted that the effect of the width $\Delta$, Figure 7, of the gap, which the knife makes in the jet, is to reduce $a$ by $\Delta$.

Jet chains of a given period T may be produced in several other ways than by synchronously rotating the knife. Thus a symmetrical knife or wall with two edges oscillating or vibrating in a plane perpendicular to the jet with a period 2T may be used. Even a simple knife may be used vibrating with a period T if the knife by some device is prevented from cutting the jet during every second half-period of the vibrations. In Figure 11 a solution of this problem is presented. The vibrating system is marked with B, B and has an arm C' to which the knife K is attached in such a way that it is free to turn about a pivot $\theta$ in one direction relatively to the line of symmetry of the arm C' while the motion in the opposite direction is limited by a stop Q. Furthermore the knife is furnished with a damping device, for example a liquid damper formed by a plate D projecting into the liquid in a vessel T. Now, when the arm C' is swinging from left to the right the stop Q will cause the knife K to follow the arm thus cutting the jet J while, when the arm C' is moved in the opposite direction, the damping device will delay the motion of the knife K thereby lifting the same and preventing it from hitting the jet J.

Even with a knife vibrating once in the period T and cutting the jet twice in the said period, jet-chains suitable for closing an electric circuit during periods between zero and T/2 may be produced. Figure 12 indicates a device of this kind. The knife K is assumed to vibrate according to $$y = y_0 s \text{ in } \frac{2\pi}{T} t$$

and to have its zero-position displaced relatively to the axis of the jet J by the distance $y_1$. If a period of interruption $T/2$ between E and E' is required this may be achieved by giving $y_1$ any value between $0.707\, y_0$ and $y_0$, corresponding to which $a$ will assume values between $\lambda/4$ and $\lambda/2$. Or if for instance it be desired to give the period of interruption the value $5/6\, T$, this can be accomplished by making $y_1 = 0.259\, y_0$ and $a = 5/6\, \lambda/2$. ($\lambda = vT$) etc.

A jet-chain of given period T may be produced from a jet-wave of the type indicated in Figures 13 and 14. The wave in question consists of curved and straight parts covering the same length and proceeding one wave-length in the time T. It may be produced through the interaction between a constant field F and a pulsating current of the period T and of the type indicated in Figure 15. The bends of the wave hit a screen U which pares them off leaving a jet-chain consisting of conductive parts a little longer than $\lambda/2 = v \cdot T/2$, $v$ being the velocity of the jet wave.

Having now considered the various ways in which jet-chains of a given period may be produced, a few applications of chains according to the invention shall be indicated. The most important is undoubtedly that of the application of the jet chains for synchronous commutation or rectification of a given alternating voltage. The first condition for such rectification is that the period of the chain $T = \lambda/v$ coincides with that of the alternating voltage. Moreover the rectification demands a definite interval of connection say one half-period or one third or two third of the half-period, and finally it requires that the interval of connection commences at a definite point of the period of the alternating voltage. The way in which these conditions are fulfilled in various forms of synchronous jet-chain rectifiers and commutators will now be considered.

Rotary type jet-chain commutator and rectifier

The jet J is cut by the knife K rotating synchronously with the alternating voltage to be commutated, Figure 16. In Figure 16, 40 designates the input terminals of the apparatus. To the terminals 40 is connected the primary of a transformer 41, the secondary of which is connected in series with the electrodes E' and E and the output terminals 42 of the apparatus. The knife K is secured to the shaft A of a synchronous motor 43 connected to the terminals 40. It is at once achieved that the period of the chain agrees with that of the voltage. The appropriate interval of interruption is, according to what has been stated above, obtained by varying the distance between the electrode E' and the plane of rotation of the knife K. In order to have the interval commence at the right point of the period of the alternating voltage it must, in the case of Figure 16, either be possible to turn the knife K on the shaft A of the synchronous motor 43 or to turn the stator of the latter relatively to its rotor. In the second form, Figure 17, the position of the electrode E has not been fixed and consequently, it is possible to obtain the right moment of commutation by moving the pair of electrodes E and E' as a unity. This property of the commutator in Figure 17, certainly means an advantage. Another advantage is that the knife K is kept away from the commutation spark. In Figure 16 the latter appears at the knife K which, therefore, must be made of a material with a melting-point above 2000° C., preferably tungsten. In Figure 17 the spark is formed between the electrode E and the end of the chain link. Thus, instead of having the knife attacked the electrode is subject to the corroding effect of the spark. It will be understood that in the case of Figure 16 the alternating current to be rectified is applied to the terminals 40. This current also serves to drive the motor 43. The current in the transformer secondary passes the electrodes E' and E and the jet J which cuts away the positive or negative half waves so that the current derived at the terminals 42 will be a rectified current.

The shaft of the knife K is not bound to rotate just once in the period of the alternating voltage. It may, for instance, make one rotation during two periods but then there must be two knives on the shaft with an angular distance of 180°, in order that the jet may be cut once in the period.

A commutator in its simplest form making use of the rectifier indicated above is shown in Figure 18 and consists of two rectifiers, the electrodes $E_1'$ and $E_2'$ of which may be connected to the terminals of the secondary $V_1$, $V_2$ of a transformer, the primary 50 of which is connected to the input terminals 51 of the commutator. The center C' of the secondary winding $V_1$, $V_2$ and the electrically interconnected electrodes $E_1$ and $E_2$ will then be the terminals to which the direct current wires $D_2$ and $D_1$ should be connected. Obviously one rotating knife may be used for cutting both jets $J_1$ and $J_2$ provided the shaft A rotates once in the period of the alternating current.

The shaft A is the shaft of a synchronous motor 52 connected to the terminals 51.

In this figure means are shown for causing the liquid jets $J_1$ and $J_2$ to emit from the electrodes $E_1$ and $E_2$, respectively. These electrodes are formed by nozzles at the lower end of vertical tubes 53 and 54 projecting downwards from a reservoir 55 containing the liquid from which the jets are formed. The liquid is fed to the reservoir 55 through a tube 56, and the reservoir is provided with an overflow tube 57 so that the liquid in the reservoir wil be at a constant level. As a consequence the velocity of the jets $J_1$ and $J_2$ will be constant. If desired the tube 57 may be adjustable in the vertical direction so that the constant velocity of the jets can be altered.

In Figure 18 also means are shown for altering the distance between the electrodes $E_1$ and $E_1'$ and the electrodes $E_2$ and $E_2'$ respectively. Each of the electrodes $E_1'$ and $E_2'$ is carried by an insulator 58 secured to a slide 59 which can be adjusted in vertical direction in relation to a fixed support 60 by means of a screw 61 which is screwed through a bracket on the support and abuts against the slide 59. According to what has been previously stated the distance between corresponding electrodes is adjusted in order to give the time of connection of the electrodes by the links of the jet the right value.

In order that the moment of connection of corresponding electrodes may also be adjusted the stator of the motor 52 is arranged rotatably in fixed bearings 62 co-axial with the shaft A, the adjustment being performed by means of a worm 63 intermeshing with a worm wheel 64 rigidly secured to the stator. When the stator is turned the phase of the knife K is altered.

It should be noted that, as a rule, the jet-chain $J_1$ must not have broken the connection between the electrodes $E_1$ and $E_1'$ before the jet $J_2$ has established it between the electrodes $E_2$ and $E_2'$. Thus for a short interval of time the transformer secondary $V_1$, $V_2$ will be short-circuited through the jets. Now in order to keep the current originating in this short-circuiting under control it is desirable to introduce a resistance in the circuit during the commutation. This can be effected in the manner indicated in Figure 19. A resistance $r$ is here inserted between the electrode $E_1'$ and a secondary electrode $e'$, and the current is forced through this resistance in the time-interval during the gap G moves from the electrode $e'$ to the electrode $E_1'$.

Jet chains produced by a rotating knife are especially adaptable to commutators in generators for direct current. Figure 20 indicates a generator with a stationary armature S and rotating magnet system (not shown). The commutator bars are 1, 2 ... 6. Each bar is hit by two jets, thus 1 by $J_{1,1}$ and $J_{2,1}$ emitted from two reservoirs $R_1$ and $R_2$ respectively mutually insulated and forming the terminals of the machine. Two knives $K_1$ and $K_2$ with an angular distance of 180° are fastened to the axis of the rotating magnet-system. The one knife will in turn cut all the jets $J_{1,1}, J_{1,2} \ldots J_{1,6}$ and these jets only, the other in the same manner the jets $J_{2,1}, J_{2,2} \ldots J_{2,6}$. Thus two sets of jet chains are produced. In each set there is in the case considered, a phase difference between two consecutive chains of 1/6 of the time of revolution. Furthermore the dimensions have been so chosen, that each jet-chain will only make connection between its reservoir and its commutator-bar during 1/6 of the time of revolution or generally a little more. Obviously the effect of the jet-chain systems is just the same as that of two rotating brushes. But the jet-chain commutator has the advantage that it may be made to stand commutation sparks of considerable intensity. This means that sparking will practically no longer put a limit to the power or voltage of a direct current generator or motor. The difference between the ordinary direct current commutator and the jet-chain type lies mainly in the fact that in the latter the commutator bars can easily be insulated against each other and that the bars are not subject to any wear by a possible spark-formation, the spark being displaced to the knife or to a non-wearing electrode between the knife and the bar.

*Jet-chain-commutators and rectifiers with knife vibrating with the period T of an alternating current*

From what has been stated above it appears that a jet-chain produced by cutting a jet by a knife oscillating or vibrating with the period of an alternating voltage may be used for the commutation or rectification of the said voltage. There are different ways to make the knife vibrate synchronously with the voltage. Two embodiments shall here be described which are especially suited for the purpose.

One is shown in Figure 21. Each of the jets $J_1$ or $J_2$ are cut twice by the knife K which vibrates synchronously with the alternating voltage. The vibrations are set up by the device shown above the rectifier. It can be termed a jet-wave vibrator and consists of a jet-wave $J^1$ hitting an oscillatory system B, B the axis of which is marked with 0. The jet-wave is produced in the ordinary way by the interaction between a constant magnet field F and an alternating current delivered by a transformer $V_a$.

The current must be synchronous with the alternating voltage to be rectified. The bar B, B will of course vibrate synchronously with the same voltage and obviously the phase-displacement between its motion and the voltage may be varied continuously by changing the distance between the field F and the bar B, B. Thus a means for adjusting the right moment for the cutting of the jets $J_1$ and $J_2$ relatively to the voltage is available, and according to what has ben set forth above, the nozzles $N_1$ and $N_2$ of the jets $J_1$ and $J_2$ may be used as electrodes. If the adjustment of the phase-displacement mentioned above is undertaken by moving the bar B, B the whole rectifier must, of course follow the vibrator. Obviously the phase-displacement in question may also be influenced by altering in some way or other, for instance by an induction regulator, the phase-difference between the voltage of the transformer $V_a$ and the voltage to be rectified.

In the rectifier shown in Figure 22 the vibration of the flat knife K is set up by a system, a so called moving coil vibrator, like that used in a moving coil ammeter. An alternating current synchronous to the voltage to be rectified is passed through the coil or frame D of the vibrator, the coil or frame being arranged in a constant magnetic field between two magnet poles N and S. If the nozzles of the jets $J_1$ and $J_2$ are to be used as electrodes, the right moment for the cutting must be adjusted by influencing the phase-difference between the current through the coil or frame D and the voltage to be rectified.

Obviously each of the two devices for producing the jet-chains in Figures 21 and 22, thus the jet-wave-vibrator and the moving coil vibrator, may also be used for the production of jet-chains with one cut to the period. It is only sufficient to apply currents with double period 2T for the production of the jet-wave J' or for the feeding of the moving coil D.

Having thus fully described my invention I claim as new and desire to secure by Letters Patent:

1. An apparatus for rectifying an alternating voltage comprising means for producing a substantially straight jet of a conductive liquid and causing the same to travel at a constant velocity, a knife, means for actuating the knife to cut the jet periodically to produce a jet chain with straight links, and two electrodes, one of which is arranged behind the other in the direction of motion of the jet, and which are positioned to make electrical contact with the jet chain, the distance between the electrodes being less than the length of the links of the jet chain.

2. An apparatus for rectifying an alternating voltage comprising an electrode forming a nozzle, means for causing a substantially straight jet of a conductive liquid to issue from the nozzle at a constant velocity, another electrode arranged in the path of the jet to make electrical contact therewith, a knife, and means for actuating the knife to cut the jet periodically at a point between the said nozzle and the second mentioned electrode to produce a jet chain with straight links connecting the nozzle and the electrode synchronously with said alternating voltage.

3. An apparatus for rectifying an alternating voltage comprising means for producing a substantially straight jet of a conductive liquid and causing the same to travel at a constant velocity, a knife, means for actuating the knife to cut the jet periodically to produce a jet chain with straight links, and two electrodes one of which is arranged behind the other in the direction of motion of the jet and which are positioned to make electrical contact with the jet chain, the electrodes being movable for altering their mutual distance to vary the period of connection of the electrodes by the links of the jet chain.

4. An apparatus for rectifying an alternating voltage comprising means for producing a substantially straight jet of a conductive liquid and causing the same to travel at a constant velocity, a knife, means for actuating the knife to cut the jet periodically in order to produce a jet chain with straight links, two electrodes one of which is arranged behind the other in the direction of motion of the jet and which are positioned to make electrical contact with the jet, means for altering the distance between the electrodes to change the period of connection of the electrodes by the links of the jet chain, and means for altering the moment of cutting of the jet by the knife for changing the moment of connection of the electrodes.

5. An apparatus for rectifying an alternating voltage comprising means for producing a substantially straight jet of a conductive liquid and causing the same to travel at a constant velocity, a knife, means for actuating the knife to rotate synchronously with the said alternating voltage and to cut the said jet to produce a jet chain with straight links, and two electrodes one of which is arranged behind the other in the direction of motion of the jet and which are positioned to make electrical contact with the links of the jet chain, the distance between the electrodes being less than the length of the links of the jet chain.

6. An apparatus for rectifying an alternating voltage comprising means for producing a substantially straight jet of a conductive liquid and causing the same to travel at a constant velocity, a knife, means for actuating the knife to rotate synchronously with the said alternating voltage once in the period of the same and to cut the jet to produce a jet chain with straight links, and two electrodes one of which is arranged behind the other in the direction of motion of the jet and which are positioned to make electrical contact with the links of the jet, the distance between the electrodes being less than the length of the links of the jet chain.

In testimony whereof I have affixed my signature.

JULIUS FREDERIK GEORG POUL HARTMANN.